(12) United States Patent
Beeson et al.

(10) Patent No.: US 8,031,623 B2
(45) Date of Patent: Oct. 4, 2011

(54) SYSTEM AND METHOD FOR CREATING MULTIPLE TRANSPORTATION STREAMS OF STREAMING MEDIA NETWORK TEST TRAFFIC IN PACKET-BASED NETWORKS

(75) Inventors: Jesse D. Beeson, Franklin, MA (US);
Peter S. Dawson, Canton, MA (US);
Richard T. Holleran, Attleboro, MA (US); Marc A. C. Todd, Foxboro, MA (US); James T. Welch, Mashpee, MA (US)

(73) Assignee: Ineoquest Technologies, Inc., Mansfield, MA (US)

( * ) Notice: Subject to any disclaimer, the term of this patent is extended or adjusted under 35 U.S.C. 154(b) by 923 days.

(21) Appl. No.: 11/257,183

(22) Filed: Oct. 24, 2005

(65) Prior Publication Data

US 2006/0088035 A1 Apr. 27, 2006

Related U.S. Application Data

(60) Provisional application No. 60/621,824, filed on Oct. 25, 2004.

(51) Int. Cl.
*H04L 1/00* (2006.01)
(52) U.S. Cl. ............. 370/252; 714/46; 714/48; 709/224
(58) Field of Classification Search .................. 370/241, 370/252; 709/204, 224; 714/25, 46, 48
See application file for complete search history.

(56) References Cited

U.S. PATENT DOCUMENTS

| | | | |
|---|---|---|---|
| 6,421,350 B1 * | 7/2002 | Szurkowski et al. | 370/419 |
| 6,738,813 B1 | 5/2004 | Reichman | |
| 6,803,964 B1 * | 10/2004 | Post et al. | 348/423.1 |
| 6,807,156 B1 | 10/2004 | Veres et al. | |
| 6,928,055 B2 | 8/2005 | Ni | |
| 7,203,869 B2 * | 4/2007 | Gwak | 714/46 |
| 7,313,593 B1 * | 12/2007 | Pulito et al. | 709/204 |
| 7,376,132 B2 * | 5/2008 | Conway | 370/389 |
| 2003/0033403 A1 | 2/2003 | Rhodes | |
| 2004/0032916 A1 * | 2/2004 | Takashima | 375/340 |
| 2004/0117427 A1 * | 6/2004 | Allen et al. | 709/200 |
| 2004/0136327 A1 | 7/2004 | Sitaraman et al. | |
| 2005/0080900 A1 * | 4/2005 | Culbertson et al. | 709/226 |
| 2006/0029067 A1 * | 2/2006 | Conway | 370/389 |
| 2006/0085553 A1 * | 4/2006 | Rachwalski et al. | 709/233 |

* cited by examiner

*Primary Examiner* — Luat Phung
(74) *Attorney, Agent, or Firm* — Holland & Knight LLP; Brian J. Colandreo, Esq.; J. Mitchell Herbert, Jr. Esq.

(57) ABSTRACT

Streaming media network transportation streams are created using an electronic system and transmitted via an electronic interface such as an existing system network conduit (i.e. Ethernet, USB, or other packet-based architectures). A scalable hardware and/or software compute engine modifies an initial stream's identifier(s) while replicating the stream content to economically create streams. Hence, an entire network's capacity of active streams may be created from a single initial stream. In one examples, an initial stream is stored in advance of transmission for such use. In other examples, an initial stream is received and processed to dynamically create streams from the initial stream as the initial stream is being received.

20 Claims, 1 Drawing Sheet

SYSTEM AND METHOD FOR CREATING MULTIPLE TRANSPORTATION STREAMS OF STREAMING MEDIA NETWORK TEST TRAFFIC IN PACKET-BASED NETWORKS

RELATED APPLICATION

This application claims the benefit of U.S. Provisional Application Ser. No. 60/621,824, filed on Oct. 25, 2004, entitled System and Method for Creating Multiple Transportation Streams of Streaming Media Network Test Traffic in Packet-Based Networks.

BACKGROUND

1. Technical Field

The present invention relates generally to the field of streaming. More specifically, the present invention is related to generating streaming data in packetized form.

2. Discussion of Prior Art

Many electronic networks such as local area networks (LANs), metropolitan area networks (MANs), and wide area networks (WANs) are increasingly being used to transport streaming media whose real-time data transport requirements exhibit high sensitivity to data loss and delivery time distortion. The technical literature is replete with various schemes to implement Quality of Service (QOS) on such networks to address the requirements of streaming media, especially when intermixed with conventional, time-insensitive, best-effort delivery protocol stack data traffic. To verify the QOS intended effectiveness, systems must be tested under stress conditions. Tests are used to verify the QOS design, implementation, and system configuration after deployment. Regardless of whether QOS-enabled or non-QOS-enabled networks are employed, it is necessary to test and verify the behavior of packet loss, delivery time distortion, and other real-time parameters of the network while operating under stress conditions that may occur when the network is used in production. Such production stress conditions often involve hundreds of streams when the network operating rate is near the currently popular 1 Gigabit per second rate. 10 Gigabit per second rate production networks under worst case loads often operate with several thousand streams.

There are many kinds of servers designed to offer high stream counts to gigabit and 10 gigabit networks for the Video on Demand marketplace, for example, that can be used to generate test traffic but consist of multiple CPUs, hard drives, large amounts of memory, and system control overhead. Such feature sets are appropriate for the design application space for these servers which require large, high availability storage arrays and multiple, high availability network interfaces to maintain a high revenue stream in the event of a single hardware failure. It is possible for such servers to generate heavy network loads for the testing application but they tend to be expensive, complex to configure for the test application, and restricted in flexibility in generating a mix of traffic types since they only generate what has been previously loaded on their storage media. These servers also tend to be limited in their capability to generate arbitrary test conditions such as particular error bit patterns in streams for testing Forward Error Correction (FEC) devices for example, limited in their capability to generate arbitrary addressed streams for verifying all network delivery paths, and limited in their capability to introduce stream encoding errors or transport errors for system testing.

There are a small number of test signal generators that can generate stream flows with selectable error conditions for testing. These are intended for media decoder testing and qualification, and for low bandwidth network device and system testing. These test generators tend to be limited in the number of streams that can be generated due to limited on-board storage capabilities and limited processing capabilities. Employing this class of test generators for loaded network testing is usually prohibitively expensive and complex due to the number of devices required and the number of network ports required to combine their many outputs to achieve the heavy network loads for stress testing.

Whatever the precise merits, features, and advantages of the above-mentioned prior art schemes, they fail to achieve or fulfill the purposes and/or the economies of the present invention.

SUMMARY

In one aspect of the invention, a method is provided for generating packetized network traffic, which includes accessing an initial IP stream clip having both content and an identifier, and generating a plurality of copies of the initial stream clip. The method further includes modifying the identifier and/or content of the plurality of copies to generate derived streams, and forwarding the derived streams to a streaming interface.

In another aspect of the invention, a system for generating packetized network traffic includes a compute engine configured for accessing an initial IP stream clip having both content and an identifier, and for generating a plurality of copies of the initial stream clip. The compute engine is further configured for modifying the identifier and/or content of the copies to generate derived streams, and for forwarding the derived streams to a streaming interface.

In a further aspect of the invention, a method is provided for generating packetized network traffic. This method includes discovering, identifying, selecting, and receiving a streaming media flow of a type desired for replication that is present on an active network for use as an initial stream clip, the initial stream clip having content and an identifier. The method also includes generating a plurality of copies of the initial stream clip, modifying the identifier of the copies to generate derived streams having substantially identical content, and forwarding packetized data corresponding to the derived streams to a streaming interface.

A still further aspect of the invention includes a system for generating packetized network traffic in the manner described in the preceding method, the system including a workstation and workstation software to configure the derived streams for one or more of: identifier modification; number of derived streams; and numbers of packet drops.

DESCRIPTION

Figure 1:
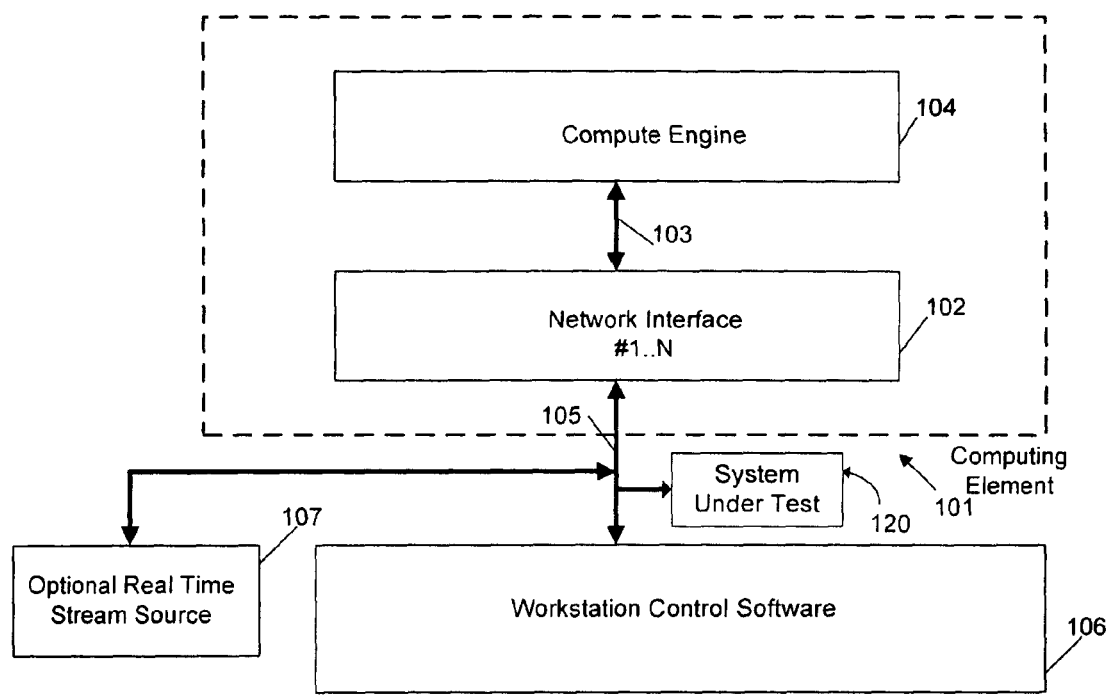
FIG. 1 illustrates one exemplary embodiment of the present invention wherein a controller is used for controlling the computing element and an external source may be used to deliver the original stream.

While this invention is illustrated and described in a preferred embodiment, the invention may be produced in many different configurations. There is depicted in the drawings, and will herein be described in detail, exemplary embodiments of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Many streaming media systems, such as VoD, broadcast television control centers, or satellite-based video distribution operations utilize packetized data networks for their data routing flexibility, low-cost, and omnipresence in modern data systems. The present invention produces high capacity, economical network loads of streaming media while accurately representing streaming media characteristics for use in device and system characterization.

FIG. 1 illustrates one exemplary embodiment of the present invention including a computing element 101 optionally controlled by a controller 106 and which optionally may use an external stream source 107. The illustrated embodiment includes a computing element 101. This device may operate on a streaming media's packet components using its compute engine 104 and may convey the results of the operation via interface 103 to the computing element's network interface 102. The network interface 102, in turn, may provide the high capacity streaming media output to the device or system under test 120 via a native network interface 105. A streaming media flow may be transmitted on a packetized network by segmenting the data flow into fixed or variable size packets which are each addressed to a common destination and identified with a common source address. Due to common protocol layering (OSI 7-Layer Model) and design techniques, such packets typically have layer 2 and layer 3 protocol addresses, layer 4 protocol port number, VLAN ID, etc. A streaming media flow thus may be identified by the n-tuple of its layer 2 and 3 address, layer 4 port number, VLAN ID, etc. The compute engine 104 may create a new flow by operating on an initial flow's packets by changing one or more of the parameters that identify a flow such as the layer 2 and/or layer 3 protocol address and/or the layer 4 port number, etc. and replicating the rest of the flow's content. The initial flow and its derivations may then be forwarded via interface 103 to the native network interface 105 providing stimulus to the device and/or system under test (DUT) 120.

The network interface 105 used for providing the stimulus may be any type network link protocol that supports packet-based transmission including, but not limited to, 802.3 (Ethernet), 802.4, 802.5, USB, ATM, SONET, 802.11, Fibre-channel, Firewire or 1394, Infiniband, Bluetooth, 802.11, 802.15, 802.16, 802.17, or ZIGBEE.

The initial streaming media flow may be stored within a nonvolatile memory that may be a part of compute engine 104. In this case, the initial streaming media flow and its derivations may be fixed at the design or manufacturing time of the compute engine 104. Alternatively, or in addition to a saved flow clip, an initial flow may be downloaded to the compute engine 104 from an external optional real time stream source 107 as shown, via the native interconnecting network 105, the computing element's 101 network interface 102, and the interface 103. This download capability adds the ability to easily change the initial clip either before or during the creation of the initial stream's derivations. Similarly, the initial flow may be selected from an active, live network carrying streaming media flows thus acquiring an initial flow without requiring a specific external action directing a stream to the invention for use with the replication scheme.

It should be noted that the destination addresses of the derived streams may simply be varied sequentially, e.g., within a single subnet mask, or alternatively, may be varied to a relatively greater extent, e.g., to include addresses within multiple subnets, to simulate streams being sent to a relatively wide geographical area. Moreover, embodiments of the present invention may effect further modifications of the derived streams. For example, compute engine 104 may modify the derived streams in a manner that enables a user to quickly distinguish among them. One such modification includes stamping each stream, e.g., with a unique visible and/or audible identifier. For example, a user viewing a video on a television or other decoder may see 'stream no. #_' on the screen, such as via a 'closed caption' track added by engine 104. Alternatively, engine 104 may add an audio track which identifies the stream number upon playback. As a further option, engine 104 may simply skew each derived stream timewise, so that a user scanning or 'channel surfing' through the streams will be aware that in fact a different stream is being decoded and viewed, simply by virtue of the fact that a currently viewed stream is running temporally ahead or behind of the previously viewed stream.

In addition, compute engine 104 may impair the source stream prior to, concurrently with, or after replicating or otherwise generating derivations thereof. For example, engine 104 may periodically drop packets from the stream, e.g., to enable a user to determine the effect of such impairment on the received signal quality. In addition, each of various derived streams may be impaired in a distinct manner, such as to generate streams of progressively greater impairment. For instance, one stream may be impaired by dropping every $5^{th}$ packet, another stream impaired by dropping every $5^{th}$ and $6^{th}$ packet, etc.

Other types of impairments that may be effected by embodiments of the present invention include the ability to create packet jitter on the streams. Those skilled in the art will recognize that jitter tends to adversely affect the ability of network devices (e.g., switches, routers) to transport streaming media (i.e., increased jitter tends to decrease the stream count). The ability to generate jitter on one or more test streams may thus be valuable in testing such network devices.

Additional types of impairment include the ability to delete selected programs within a Multi Program Transport Stream (MPTS). This ability may be used to test and evaluate stream processors and multiplexers.

Embodiments of the invention may also impair data streams by modifying encoded bit rates (e.g., the bit rate at which a data stream is originally encoded) and/or transmitted bit rates (the rate at which the stream is actually transmitted, which may be distinct from the encoded bit rate). These bit rate impairments may be used to test and evaluate decoder performance.

Additional impairments may include the dropping of packets based on their compressed picture types. For example, packets may be filtered, so that selected types of encoded frames, e.g., I frames, B frames and/or P frames, may be dropped. This impairment may be used to test and evaluate decoder performance.

Moreover, each stream may be stamped as discussed hereinabove, to enable a user to quickly identify the stream as it is being viewed or otherwise decoded.

It should also be noted that the compute engine 104 may record an impairment occurring on a live stream received from real time source 107, which may then be replicated for use in the derived streams. This capture and re-use of real time impairments may offer enhanced opportunities to evaluate their effects on systems under test 120.

With the optional addition of a workstation and workstation control software 106 connected to the native packet based network 105, dynamic changes and configuration of the computing element 101 and of the optional real time stream source 107 may be effected. Such changes/configuration include configuring the number of derived streams being produced by compute engine 104 and thus the ultimate network load presented. Other changes include the specific identifier modifications, such as the particular addresses/address ranges and/or port numbers used in the derived streams, the selection of network interface(s) 102 that are activated, the selection of the specific initial stream, the selection of optional real time stream source 107, and the selection of particular impairments (e.g., number of packet drops), etc. Those skilled in the art will recognize that multiple network interfaces 102 may be used to conveniently scale to relatively large numbers of data streams.

The initial streaming media flow stored may be selected to require little memory space and thus be very economical as the initial streaming media flow may be repeatedly transmitted as the content of the streaming media flow packets. For test purposes, it may be desired that the content of the packets be displayable using a standard play back device such as a video or audio decoder. Thus the initial flow's packets may be actual encoded streaming media content such as voice and/or video or may be fixed or repeating patterns of bits if such playback is not desired. The flow content which is contained in the packet contents need not be replicated or modified on a per flow basis thus minimizing memory and processing costs.

It should be noted that more than one network interface can be used to transmit network traffic. For example, FIG. 1 illustrates computing element 101 with up to N network interfaces 102, with streams fed from Compute Engine 104 via interface 103. The network interfaces 102 connect to the network and/or device under test 120 via network connection 105. Network link protocols that support such packet-based transmission include, but are not limited to, 802.3 (Ethernet), 802.4, 802.5, USB, ATM, SONET, 802.11, Fibre-channel, Firewire or 1394, Infiniband, Bluetooth, 802.15, 802.16, 802.17, ZIGBEE, or DVB-ASI.

The compute engine 104 may be configured via interface 103, network interface 102, native network interconnect 105, and workstation control software 106 such that it can modify and replicate the desired streaming media flows from the initial stream. For example, compute engine 104 may be configured to select among multiple stored initial streams, to select between a stored initial stream and one downloaded from an optional real time stream source 107, to select initial stream addresses, port numbers, number of streams, or other stream identification or content information. It should be noted that network interface 102, interface 103, and workstation (management system) 106 may be physically co-located with the compute engine 104 and need not be external.

It should be noted that a pure hardware, a pure software, and a hybrid hardware/software implementation of the compute engine components is envisioned. It should be noted that various kinds of interfaces can be used for establishing a packet-based communication session between the various components of these embodiments, and with the system under test 120, such as (but not limited to) a gigabit Ethernet network controller or a 10/100 Mbit/s Ethernet network interface card. Moreover, one skilled in the art can envision using various current and future interfaces and, hence, the type of packetized network interface used should not be used to limit the scope for the present invention.

The present invention allows the implementer the ability to scale the amount of generated stream data to pass through a device or system up to the maximum supported by the network conduit and down to nothing. Additionally, the present invention provides the ability to scale with improvements in network conduit technology. For example, the faster the network conduit, the more replicated streams that can be generated.

Furthermore, embodiments of the present invention include computer program code based products, which may include a storage medium having program code stored therein which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

Moreover, although embodiments of the present invention have been shown and described as stand-alone modules connectable to a data stream, embodiments of the invention may also be co-located with nominally any network component. For example, embodiments may include hardware, software, and/or hybrid hardware/software components disposed within otherwise conventional network devices or nodes, such as IP switches, routers, servers, VoD servers, VoIP servers, PCs, blades, DSLAMs (Digital Subscriber Line Access Multiplexer), Set Top Boxes (e.g., for CATV), IP Phones, streaming test Generators, streaming sources such as MPEG or other stream compression encoders, stream multiplexers, etc.

Embodiments of the computer program code based products may be configured for: (a) receiving network traffic including one or more transportation streams; (b) generating new address identification information for the transportation streams; (c) forwarding the newly constituted streams to a data consumer.

There is thus provided a system and method for generating large numbers of packetized streams of network traffic for device and system testing. In one embodiment, the system includes: (a) zero or more interfaces to receive a copy of network traffic including one or more streams; (b) zero or more storage medium containing one or more streams; (c) a compute engine to receive the test stream and capable of generating one or more sets of stream identifiers (e.g., address information) for the generated streams, and, (d) a native streaming interface to transmit packetized data corresponding to the generated (replicated) stream(s), wherein the native streaming interface provides the means to permit transmission of the streams to the network and/or device under test.

In another embodiment, the present invention provides for a system and method for generating packetized network traffic including one or more transportation streams wherein aspects of the streams, such as the stream identifier(s), including the aforementioned new IP address information and the number of streams to be generated, etc., and content, may be downloaded from a Control Workstation 106 or from a Network-resident program source. This system includes: (a) one or more network interfaces to receive streaming network traffic associated with the transportation streams; (b) a compute engine capable of generating one or more sets of address information for the generated streams; (c) a workstation capable of configuring the compute engine and/or sourcing the original stream; and (d) zero or more original stream sources capable of generating one or more streams to the network interface(s).

A system and method has been shown in the above embodiments for the effective implementation of a system and method for generating economical and scalable levels of streaming network traffic for evaluating devices and systems under test. While various preferred embodiments have been shown and described, it will be understood that there is no intent to limit the invention by such disclosure but, rather, it is intended to cover all modifications and alternate constructions falling within the spirit and scope of the invention as defined in the appended claims. For example, the present invention should not be limited by number of network interfaces, number of streams, type of packetized network conduit, location of control software, choice of hardware or software implementation of compute engine, type of streaming media data, computing environment, or specific hardware associated with the network interfaces or compute engine system.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or nonvolatile, and may be retrieved by the user in any of: conventional computer storage, display (e.g., CRT) and/or hardcopy (i.e., printed) formats. The programming of the present invention may be implemented by one skilled in the art of computer systems and/or software design.

The invention claimed is:

1. A computer-implemented method for generating packetized network traffic comprising:
   accessing an initial IP stream clip having both content and an identifier;
   generating a plurality of copies of the initial IP stream clip;
   modifying the identifier of the plurality of copies to generate derived streams;
   modifying the content of each of the plurality of copies to correspond to the identifier thereof, wherein decoded versions of the plurality of copies are distinguished from one another, and wherein the modification of the content includes applying a stamp selected from the group consisting of a visual signal and an audible signal;
   introducing a first impairment into a first of the plurality of streams;
   introducing a second impairment into a second of the plurality of streams, wherein the impairment includes dropping of packets based, at least in part, upon a compressed frame type; and
   forwarding packetized data corresponding to the derived streams to a streaming interface.

2. The computer-implemented method of claim 1, wherein the identifier includes at least one of an IP layer 2 address, an IP layer 3 address, and an IP layer 4 port number.

3. The computer-implemented method of claim 1, wherein said generating includes replicating the content of the initial IP stream clip.

4. The computer-implemented method of claim 1, wherein said modifying includes temporally offsetting the derived streams from one another.

5. The computer-implemented method of claim 1, wherein said accessing includes accessing the initial IP stream clip from a fixed, stored, nonvolatile memory that is loaded at time of manufacture.

6. The computer-implemented method of claim 5, wherein the fixed, stored, nonvolatile memory is disposed within a workstation.

7. The computer-implemented method of claim 1, wherein said accessing includes downloading the initial IP stream clip from a network.

8. The computer-implemented method of claim 1, further comprising introducing predetermined impairments to the derived streams.

9. The computer-implemented method of claim 8, wherein said introducing includes introducing one or more impairments selected from the group consisting of:
   selectable numbers of packet drops, selectable types of packet drops, packet jitter, deletion of selected programs within a Multi Program Transport Stream (MPTS), modification of encoded bit rates, and modification of transmitted bit rates.

10. The computer-implemented method of claim 1, wherein the initial IP stream clip includes at least one impairment that is copied to the derived streams.

11. A computing system for generating packetized network traffic, the computing system comprising a compute engine configured for:
   accessing an initial IP stream clip having both content and an identifier;
   generating a plurality of copies of the initial IP stream clip;
   modifying the identifier of the plurality of copies to generate derived streams;
   modifying the content of each of the plurality of copies to correspond to the identifier thereof, wherein decoded versions of the plurality of copies are distinguished from one another, and wherein the modification of the content includes applying a stamp selected from the group consisting of a visual signal and an audible signal;
   introducing a first impairment into a first of the plurality of streams;
   introducing a second impairment into a second of the plurality of streams, wherein the impairment includes dropping of packets based, at least in part, upon a compressed frame type; and
   forwarding packetized data corresponding to the derived streams to a streaming interface.

12. The computing system of claim 11, further comprising:
   a workstation couplable to said compute engine; and
   workstation software to configure one or more of the identifier, content, and number of derived streams.

13. The computing system of claim 12, wherein the workstation software is configured to direct introduction of predetermined impairments to the derived streams.

14. The computing system of claim 11, wherein the identifier includes at least one of an IP layer 2 address, an IP layer 3 address, and an IP layer 4 port number.

15. The computing system of claim 11, wherein said generating includes replicating the content of the initial IP stream clip.

16. The computing system of claim 11, wherein said modifying includes temporally offsetting the derived streams from one another.

17. The computing system of claim 11, wherein said accessing includes accessing the initial IP stream clip from a fixed, stored, nonvolatile memory that is loaded at time of manufacture.

18. The computing system of claim 11, wherein said accessing includes downloading the initial IP stream clip from a network.

19. The computing system of claim 11, further comprising introducing predetermined impairments to the derived streams.

20. The computing system of claim 19, wherein said introducing includes introducing one or more impairments selected from the group consisting of:
   selectable numbers of packet drops, selectable types of packet drops, packet jitter, deletion of selected programs within a Multi Program Transport Stream (MPTS), modification of encoded bit rates, and modification of transmitted bit rates.

* * * * *